(12) United States Patent
Omura

(10) Patent No.: US 9,076,478 B2
(45) Date of Patent: Jul. 7, 2015

(54) BINDER RESIN COMPOSITION FOR MAGNETIC RECORDING MEDIUM, METHOD OF MANUFACTURING THE SAME, AND MAGNETIC RECORDING MEDIUM

(75) Inventor: Kazufumi Omura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 528 days.

(21) Appl. No.: 13/348,248

(22) Filed: Jan. 11, 2012

(65) Prior Publication Data

US 2012/0177950 A1    Jul. 12, 2012

(30) Foreign Application Priority Data

Jan. 12, 2011 (JP) ................. 2011-003665
Jan. 11, 2012 (JP) ................. 2012-003500

(51) Int. Cl.
G11B 5/706 (2006.01)
G11B 5/702 (2006.01)
C08F 259/04 (2006.01)

(52) U.S. Cl.
CPC ............ *G11B 5/7023* (2013.01); *G11B 5/7026* (2013.01); *C08F 259/04* (2013.01)

(58) Field of Classification Search
None
See application file for complete search history.

(56) References Cited

U.S. PATENT DOCUMENTS

| | | | |
|---|---|---|---|
| 4,946,615 A | 8/1990 | Mizuno et al. | |
| 5,300,244 A | 4/1994 | Mizuno et al. | |
| 6,759,119 B2 | 7/2004 | Murayama et al. | |
| 7,001,955 B2 | 2/2006 | Sasaki et al. | |
| 7,201,978 B2 | 4/2007 | Tanaka et al. | |
| 7,432,000 B2 * | 10/2008 | Kuwajima et al. | 428/841.2 |
| 7,737,304 B2 | 6/2010 | Omura et al. | |
| 7,737,305 B2 | 6/2010 | Omura et al. | |
| 2003/0064242 A1 | 4/2003 | Wittebrood et al. | |
| 2003/0064252 A1 | 4/2003 | Murayama et al. | |
| 2004/0241453 A1 | 12/2004 | Sasaki et al. | |
| 2004/0241497 A1 | 12/2004 | Sasaki et al. | |
| 2005/0118459 A1 | 6/2005 | Tanaka et al. | |
| 2009/0087687 A1 | 4/2009 | Omura et al. | |
| 2009/0142622 A1 | 6/2009 | Nakamura | |
| 2009/0258254 A1 | 10/2009 | Omura et al. | |
| 2011/0281025 A1 | 11/2011 | Arai et al. | |

FOREIGN PATENT DOCUMENTS

| | | | |
|---|---|---|---|
| JP | 62-018564 A | 1/1987 | |
| JP | 64-079274 A | 3/1989 | |
| JP | 01-106338 A | 4/1989 | |
| JP | 1-026627 B2 | 5/1989 | |
| JP | 05-182175 A | 7/1993 | |
| JP | 2000109537 A * | 4/2000 | ............ C08G 18/62 |
| JP | 3125947 B2 | 1/2001 | |
| JP | 2002-352410 A | 12/2002 | |
| JP | 2004-352804 A | 12/2004 | |
| JP | 2004-352804 A | 12/2004 | |
| JP | 2005-008866 A | 1/2005 | |
| JP | 2005-182985 A | 7/2005 | |
| JP | 2006-202417 A | 8/2006 | |
| JP | 2009-096798 A | 5/2009 | |
| JP | 2009-134838 A | 6/2009 | |
| WO | 2010/087318 A1 | 8/2010 | |

OTHER PUBLICATIONS

JP 2000-109537: Machine English Translation and Derwent Abstract.*
Decision to Grant dated Oct. 1, 2013 in Japanese Application No. 2012-003500.
Office Action dated Jan. 29, 2013 on Japanese Application No. JP 2012-003500.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a binder resin composition for a magnetic recording medium, which comprises a vinyl chloride resin containing a radiation-curable functional group, and a methacrylate compound denoted by formula (A):

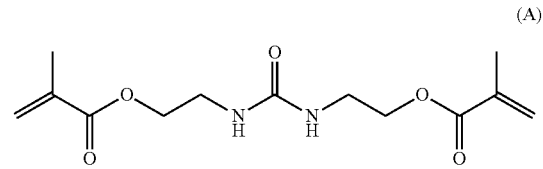

in an amount of equal to or more than 0.3 weight percent but equal to or less than 10 weight percent relative to a content of the vinyl chloride resin.

9 Claims, No Drawings

BINDER RESIN COMPOSITION FOR MAGNETIC RECORDING MEDIUM, METHOD OF MANUFACTURING THE SAME, AND MAGNETIC RECORDING MEDIUM

CROSS-REFERENCE TO RELATED APPLICATIONS

This application claims the benefit of priority under 35 USC 119 to Japanese Patent Application No. 2011-003665 filed on Jan. 12, 2011, and Japanese Patent Application No. 2012-003500 filed on Jan. 11, 2012, which are expressly incorporated herein by reference in their entirety.

BACKGROUND OF THE INVENTION

1. Field of the Invention

The present invention relates to a binder resin composition for a magnetic recording medium and to a method of manufacturing the same. More particularly, the present invention relates to a binder resin composition for a magnetic recording medium, that permits the formation of a coating with suitable flexibility as a layer contained in a magnetic recording medium, and to a method of manufacturing the same.

Still further, the present invention relates to a magnetic recording medium having a radiation-cured layer formed using the above composition.

2. Discussion of the Background

In particulate magnetic recording media, binders play important roles in the dispersibility of magnetic and nonmagnetic powders, coating durability, electromagnetic characteristics, running durability, and the like. Accordingly, various research has been conducted on binders for magnetic recording media.

Conventionally, thermosetting resins and thermoplastic resins such as vinyl chloride resins, polyurethane resins, polyester resins, and acrylic resins have been widely employed as binders in magnetic recording media. In contrast, in recent years, the use of radiation-curable resins incorporating radiation-curable functional groups as binders for magnetic recording media has been proposed to obtain tougher coatings with good productivity. In this regard, reference can be made to, for example, Japanese Unexamined Patent Publication (KOKAI) No. 2005-182985 or English language family member US2005/118459A1 and U.S. Pat. No. 7,201,978, Japanese Unexamined Patent Publication (KOKAI) No. 2004-352804 or English language family member US2004/0241497A1 and U.S. Pat. No. 7,001,955, Japanese Unexamined Patent Publication (KOKAI) No. 2005-8866 or English language family member US2004/241453A1, and Japanese Patent No. 3,125,947, which are expressly incorporated herein by reference in their entirety.

Vinyl chloride resins are known to form tough coatings. As described in the above publications, the incorporation of a radiation-curable functional group makes it possible to form a further tough coating. However, to obtain a magnetic recording medium having good running durability, it is not enough to form a high-strength coating in a magnetic recording medium. Coatings that are strong but lack flexibility are brittle and tend to break. Thus, with repeated running, there may be a risk that a portion of the film will be damaged and drop out, or cause the generation of matter that adheres to the head. In conventional radiation-curable vinyl chloride resins such as those described in the above publications, cured films formed by subjecting compositions containing such resins to a radiation curing treatment are tough but lack flexibility. Thus, there is need for further improvement in the binder resins employed in magnetic recording media.

SUMMARY OF THE INVENTION

An aspect of the present invention provides for a resin composition, for use in a magnetic recording medium, that permits the formation of coatings that are of high strength and suitable flexibility.

Although the above-described radiation-curable vinyl chloride resins permit the formation of high-strength coatings, the coatings that are obtained present problems in that they lack flexibility and tend to break with repeated running. The lower the breaking stress of a coating, or the less a coating tends to elongate, the greater the tendency to break. Thus, both high strength and suitable flexibility could be achieved in coatings formed out of radiation-curable vinyl chloride resins if a component that enhanced the breaking stress and tendency for elongation without greatly affecting the strength of the coating could be discovered.

Accordingly, the present inventor conducted extensive research targeting such a component, focusing on the methacrylate monomer having the structure (formula (A)) given below. On that basis, the present inventor conducted further research, resulting in the discovery that when the above methacrylate monomer was present in a prescribed quantity in a composition containing a radiation-curable vinyl chloride resin, it had the effect of enhancing the coating elasticity (breaking stress, elongation) without greatly affecting the glass transition temperature or gel content of the coating farmed by radiation-curing the composition. That is, it was discovered that subjecting a composition containing the above methacrylate monomer in a prescribed quantity along with a radiation-curable vinyl chloride resin to radiation curing permitted the formation of a coating of high strength and suitable flexibility. In that regard, the present inventor surmises that the above methacrylate monomer forms a crosslinked structure with the radiation-curable vinyl chloride resin, thereby contributing to the flexibility of the coating, and that it also balances the urea moiety, which is a high Tg fragment in the structure below (formula (A)), with the low Tg fragment connected to it, thereby not greatly affecting the strength of the coating.

The present invention was devised on that basis.

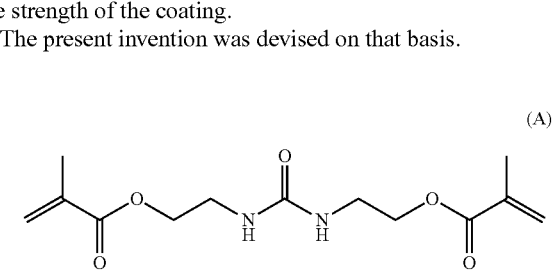

(A)

An aspect of the present invention relates to a binder resin composition for a magnetic recording medium, which comprises:

a vinyl chloride resin containing a radiation-curable functional group, and a methacrylate compound denoted by the above formula (A) in an amount of equal to or more than 0.3 weight percent but equal to or less than 10 weight percent relative to a content of the vinyl chloride resin.

The radiation-curable functional group may be a methacryloyloxy group.

The vinyl chloride resin containing a radiation-curable functional group may comprise 100 to 500 mmol/kg of the radiation-curable functional group.

The vinyl chloride resin containing a radiation-curable functional group may comprise a sulfuric acid group and/or a sulfate group.

A further aspect of the present invention relates to a method of manufacturing a binder resin composition for a magnetic recording medium, wherein the binder resin composition to be manufactured comprises:

a vinyl chloride resin containing a radiation-curable functional group in the form of a methacryloyloxy group, and a methacrylate compound denoted by the above formula (A) in an amount of equal to or more than 0.3 weight percent but equal to or less than 10 weight percent relative to a content of the vinyl chloride resin, and the method comprises:

reacting a vinyl chloride resin containing an active hydrogen group within the molecule thereof with 2-methacryloyloxyethyl isocyanate to obtain the vinyl chloride resin containing a radiation-curable functional group, and causing the methacrylate compound denoted by the above formula (A) to be produced in the reaction.

The reaction may be conducted in the presence of an organic tin catalyst.

The active hydrogen group may be a hydroxyl group.

The vinyl chloride resin containing an active hydrogen group may comprise an epoxy group within the molecule thereof.

The vinyl chloride resin containing a radiation-curable functional group that is obtained by the reaction may comprise 100 to 500 mmol/kg of the radiation-curable functional group.

The vinyl chloride resin containing a radiation-curable functional group that is obtained by the reaction may comprise a sulfuric acid group and/or a sulfate group.

A still further aspect of the present invention relates to a magnetic recording medium comprising a magnetic layer containing a ferromagnetic powder and a binder on a nonmagnetic support, which comprises a radiation-cured layer that has been formed by radiation-curing a coating layer containing a binder resin composition for a magnetic recording medium, wherein the binder resin composition comprises:

a vinyl chloride resin containing a radiation-curable functional group, and a methacrylate compound denoted by the above formula (A) in an amount of equal to or more than 0.3 weight percent but equal to or less than 10 weight percent relative to a content of the vinyl chloride resin.

The radiation-cured layer may be the magnetic layer.

The magnetic recording medium may comprise a nonmagnetic layer containing a nonmagnetic powder and a binder between the nonmagnetic support and the magnetic layer, wherein the nonmagnetic layer is the radiation-cured layer.

The radiation-curable functional group contained in the vinyl chloride resin may be a methacryloyloxy group.

The vinyl chloride resin containing a radiation-curable functional group may comprise 100 to 500 mmol/kg of the radiation-curable functional group.

The vinyl chloride resin containing a radiation-curable functional group may comprise a sulfuric acid group and/or a sulfate group.

The present invention can provide a magnetic recording medium having a coating that is of both high coating strength and suitable flexibility.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Binder Resin Composition for Magnetic Recording Medium

The binder resin composition for a magnetic recording medium (also referred to simply as the "composition", hereinafter) of the present invention is a composition that is used to prepare a coating liquid for forming a particulate magnetic recording medium and that contains, in addition to a vinyl chloride resin containing a radiation-curable functional group, equal to or more than 0.3 weight percent but equal to or less than 10 weight percent of the methacrylate compound denoted by formula (A) below (also referred to as "component A", hereinafter) relative to the content of the vinyl chloride resin (100 weight percent).

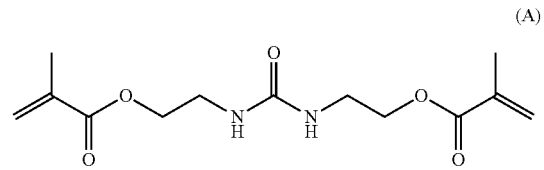 [SMILES: C=C(C)C(=O)OCCNC(=O)NCCOC(=O)C(=C)C]

(A)

The binder composition for a magnetic recording medium of the present invention will be described in greater detail below.

The vinyl chloride resin containing a radiation-curable functional group that is contained in the composition of the present invention is not specifically limited other than that it be capable of undergoing a curing reaction (crosslinking reaction) when irradiated with radiation. From the perspective of reactivity, the presence of a radical polymerizable carbon-carbon double bond group as a radiation-curable functional group is desirable, and the presence of an acrylic double bond group is preferred. In this context, the term "acrylic double bond group" means the residue of an acrylic acid, an acrylic acid ester, an amide acrylate, a methacrylic acid, a methacrylic acid ester, an amide methacrylate, or the like. Of these, from the perspective of reactivity, a (meth) acryloyloxy group is desirable. In the present invention, the term "(meth)acryloyloxy group" includes both methacryloyloxy and acryloyloxy groups.

When 2-methacryloyloxyethyl isocyanate (MOI, structure given below) is employed as the radiation-curable functional group-incorporating component, it is possible to obtain a vinyl chloride resin having a radiation-curable functional group in the form of a methacryloyloxy group.

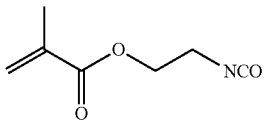

In the reaction between the above MOI and vinyl chloride resin, so long as water is present in the system, component A will necessarily be produced as a by-product. To reduce the quantity of component A that is produced as a by-product to zero, it is necessary to completely eliminate water from the reaction system. To that end, starting materials must be subjected to special management as well as subjected to a dehydration treatment prior to the reaction. However, conducting such steps greatly compromises productivity.

By contrast, as discovered by the present inventor, the presence of a prescribed quantity of the component A that is generated as a by-product of the above reaction along with radiation-curable functional group-containing vinyl chloride resin can contribute to the formation of a coating that is of high strength and suitable flexibility. Accordingly, it is possible to employ the resin solution that is obtained as a binder composition for a magnetic recording medium without removing the component A that is generated as a by-product of the above reaction. Thus, one of the advantages of the present invention is that it permits the obtaining of a binder composition for a magnetic recording medium that permits the formation of a coating that is strong and of suitable flexibility, without compromising mass-productivity. However, the present invention is not limited to embodiments in which component A is obtained as a by-product of the reaction between MOI and vinyl chloride resin. The present invention also includes embodiments in which component A is mixed as an additive into a composition containing a radiation-curable functional group-containing vinyl chloride resin.

The composition of the present invention, by containing equal to or more than 0.3 weight percent of component A relative to the content (100 weight percent) of radiation-curable functional group-containing vinyl chloride in the composition, permits the formation, by curing the composition with radiation, of a coating that is of high strength, has high breaking stress, and tends not to break with repeated running. When the content is less than 0.3 weight percent, it is difficult to impart to the coating elasticity suited to preventing breakage with repeated running. However, when the content exceeds 10 weight percent, the precipitation of component A makes it difficult to form the coating itself. From these perspectives, the content of component A in the composition of the present invention is set to equal to or more than 0.3 weight percent but equal to or less than 10 weight percent of the content (100 weight percent) of the radiation-curable functional group-containing vinyl chloride resin in the composition. Since raising both the breaking stress and tendency for elongation is desirable to form a magnetic recording medium having good running durability capable of withstanding repeated running, the above content is desirably equal to or less than 7 weight percent, preferably equal to or less than 6 weight percent. When component A is produced as a by-product of the reaction between MOI and vinyl chloride resin as set forth above, a large amount of water will be present within the system when the quantity of component A exceeds 7 weight percent of the radiation-curable functional group-containing vinyl chloride resin. Thus, to prepare a coating liquid for forming a magnetic recording medium from the resin solution obtained, a step is desirably conducted to remove the water (because the film may plasticize when a large amount of water is present). Accordingly, from the perspective of obviating the need for a water removal step, when producing component A as a by-product of the reaction between MOI and vinyl chloride resin, the quantity of component A that is present is desirably kept to equal to or less than 7 weight percent, preferably equal to or less than 6 weight percent, of the quantity of radiation-curable functional group-containing vinyl chloride resin.

The components contained in the composition of the present invention will be sequentially described in greater detail below.

Radiation-Curable Functional Group-Containing Vinyl Chloride Resin

The radiation-curable functional group-containing vinyl chloride resin that is contained in the composition of the present invention can be obtained by known methods such as the method of incorporating a radiation-curable functional group into a polymer or copolymer of a vinyl chloride monomer. As set forth above, the use of MOI as the radiation-curable functional group-incorporating component permits the obtaining of a composition containing component A.

The vinyl chloride resin incorporating the radiation-curable functional group by means of a radiation-curable functional group-incorporating component such as MOI is not specifically limited. A vinyl chloride resin having an active hydrogen group such as a hydroxyl group, a primary amine or secondary amine within the molecule is desirable because the reactivity with the radiation-curable functional group-incorporating component will be high and the reaction incorporating the radiation-curable functional group will proceed smoothly. Such a vinyl chloride resin can be synthesized by known methods, or obtained in the form of a commercial product. Examples of commercially available products are MR110, MR104, MR112, and MR113 from Zeon Corporation; Solvain A, Solvain TAO, Solvain MK6 from Nissin Chemical Co., Ltd.; and the like. Of these, from the perspective of reactivity with the radiation-curable functional group-incorporating component, a hydroxyl group is desirable as the above active hydrogen group.

The incorporation of a polar group to enhance the dispersibility of magnetic and nonmagnetic powders and the like into binder for use in magnetic recording media is widely practiced. A polar group is also desirably present in the radiation-curable functional group-containing vinyl chloride resin to enhance the dispersibility. Examples of polar groups are hydroxyalkyl groups, carboxylic acid (salt) groups, sulfonic acid (salt) groups, sulfuric acid (salt) groups, and phosphoric acid (salt) groups. Sulfuric acid (salt) groups are desirable from the perspectives of enhancing the dispersibility and the availability of starting materials.

In the present invention, the term "sulfuric acid (salt) group" means a substituent denoted by general formula (a) below, and includes the sulfuric acid group (—OSO$_3$H) and sulfate groups such as —OSO$_3$Na, —OSO$_3$Li, and —OSO$_3$K. The same applies to carboxylic acid (salt) groups, sulfonic acid (salt) groups, phosphoric acid (salt) groups, and the like.

(a)

In general formula (a) above, M denotes a hydrogen atom or a cation, and * denotes a bond position.

The cation can be an inorganic cation or an organic cation. So long as the cation electrically neutralizes the —SO$_3^-$ in general formula (a), it is not limited to a monovalent cation, and can be a divalent or higher cation. A monovalent cation is desirable as the cation denoted by M. To say that a cation of valence n is being employed means that (1/n) moles of the cation are employed for the substituent denoted by general formula (a).

The inorganic cation is not specifically limited. An alkali metal ion or alkaline earth metal ion is desirable, an alkali metal ion is preferred, and Li$^+$, Na$^+$, or K$^+$ is of greater preference.

Examples of organic cations are ammonium ions, quaternary ammonium ions, and pyridinium ions.

M desirably denotes a hydrogen atom or alkali metal ion; preferably denotes a hydrogen ion, Li$^+$, Na$^+$, or K$^+$; and more preferably denotes K$^+$.

The radiation-curable functional group-containing vinyl chloride resin can contain one kind of substituent or two or more different substituents including the substituent denoted by general formula (a). The substituent can be incorporated into the vinyl chloride resin by copolymerization or addition reaction based on known methods. Vinyl chloride resins incorporating polar groups are also available as commercial products. Examples of commercial products are MR104, MR110, and MR120 made by Zeon Corporation. Sulfuric acid (salt) group-containing vinyl chloride resins can be subjected to salt exchange by known methods to obtain vinyl chloride resins containing other sulfate groups, or can be subjected to salt removal by known methods to obtain sulfuric acid-containing vinyl chloride resins. The same applies to vinyl chloride resins having polar groups other than sulfuric acid (salt) groups, such as sulfonic acid (salt) groups.

A vinyl chloride resin having epoxy groups to further enhance the strength of the coating formed and inhibit dehydrochlorination is desirably employed to obtain a composition containing an epoxy group and methacryloyloxy group-containing vinyl chloride resin. From the perspectives set forth above, a radiation-curable functional group-incorporating component such as MOI is desirably used to incorporate a radiation-curable functional group into a vinyl chloride resin containing a polar group, hydroxyl group, and epoxy group in the molecule such as the resin described in Japanese Examined Patent Publication (KOKOKU) Heisei No. 1-26627, which is expressly incorporated herein by reference in its entirety, to obtain a radiation-curable functional group-containing vinyl chloride resin in the present invention. In the vinyl chloride resin that is obtained, most of the OH groups react with the radiation-curable functional group-incorporating component. The radiation-curable functional groups are incorporated into side chains through urethane bonds, and epoxy groups and polar groups are present.

Component A

As set forth above, the methacrylate compound (component A) that is denoted by formula (A) can be obtained, for example, as a by-product of the reaction of vinyl chloride resin and MOI, or can be added to the composition as an additive. As set forth above, the quantity of component A that is present in the composition of the present invention is equal to or more than 0.3 weight percent of the content of the radiation-curable functional group-containing vinyl chloride resin. In above-cited Japanese Unexamined Patent Publication (KOKAI) No. 2005-182985, the quantity of by-product (multifunctional acryl monomer) such as component A is described as varying with the water in the reaction system. However, since the by-product is produced by the reaction of water and the radiation-curable functional group-incorporating component, the quantity of by-product also varies with the quantity of radiation-curable functional group-incorporating component employed. Accordingly, when component A is being obtained as a by-product, the quantity of by-product, that is, the quantity of component A that is present in the composition of the present invention, can be controlled by means of the quantity of water and the quantity of radiation-curable functional group-incorporating component that are employed in the reaction system. However, the more the quantity of radiation-curable functional group-incorporating component is reduced, the fewer the radiation-curable functional groups that are incorporated into the vinyl chloride resin. Thus, within a range permitting the introduction of radiation-curable functional groups in a quantity imparting the desired curability, the quantity of by-product produced is desirably controlled by means of the quantity of radiation-curable functional group-incorporating component and the water content of the reaction system. The water content can be adjusted by means of the starting material storage conditions and by a dehydration treatment prior to the reaction. However, in a vinyl chloride resin containing hydroxyl groups as active hydrogen groups, a dehydration reaction may cause the hydroxyl groups to denature, presenting a risk of losing reactivity between the isocyanate groups in the radiation-curable functional group-incorporating component. Thus, dehydration treatment is undesirable. Accordingly, in that case, a method other than dehydration treatment is desirably used to control the quantity of component A that is generated as a by-product.

The reaction for incorporating the radiation-curable functional group or polar group into the vinyl chloride resin can be conducted by dissolving the starting material compounds in a solvent (reaction solvent), and heating, pressurizing, backfilling with nitrogen, and the like as needed. Commonly employed reaction conditions, such as the reaction temperature and reaction time, can be employed in the reaction.

Known reaction catalysts can be employed as the catalyst suitable for use in the above reaction. Examples are amine catalysts, organic tin catalysts, and organic bismuth catalysts. Examples of amine catalysts are diethylene triamine, N-methylmorpholine, tetramethylhexamethylenediamine, dimethylformamide, dimethylacetamide, and N-methylpyrrolidone. Examples of organic tin catalysts are dibutyltin dilaurate, dioctyltin dilaurate, dibutyltin didecanate, and dioctyltin didecanate. An example of an organic bismuth catalyst is bismuthtris(2-ethylhexanoate). From the perspective of reaction efficiency, an organic tin catalyst is desirably employed as the catalyst in the present invention.

The quantity of catalyst added is, for example, 0.00001 to 5 weight parts, preferably 0.00001 to 1 weight part, and more preferably, 0.00001 to 0.1 weight part, per the total weight of the starting materials employed in the reaction.

The reaction solvent can be selected from among known solvents commonly employed in the above reaction. Examples are: ketone solvents such as acetone, methyl ethyl ketone, and cyclohexanone; ester solvents such as methyl acetate, ethyl acetate, and ethyl lactate; ether solvents such as dioxane and tetrahydrofuran; aromatic solvents such as toluene and xylene; amide solvents such as N,N-dimethyl formamide, N,N-dimethyl acetamide, and N-methylpyrrolidone; sulfoxide solvents such as dimethyl sulfoxide; methylene chloride; chloroform; and cyclohexane. The solvent employed as the reaction solvent above can be incorporated as the solvent in the composition of the present invention. The incorporation of methyl ethyl ketone, cyclohexanone, and mixed solvents thereof, which are widely employed in coating liquids for forming magnetic recording media, are preferably employed. The composition containing the above solvent can be employed as is, or optional additives can be added for use as a coating liquid for forming magnetic recording media.

Various properties of the radiation-curable functional group-containing vinyl chloride resin contained in the composition of the present invention will be described next.

(a) Average Molecular Weight and Molecular Weight Distribution

The radiation-curable functional group-containing vinyl chloride resin desirably has a weight average molecular weight of equal to or greater than 10,000 but equal to or less than 500,000 (in the present invention, the phrasing "equal to or greater than 10,000 but equal to or less than 500,000" can also be expressed as "10,000 to 500,000"; identical below), preferably 10,000 to 400,000, and more preferably, 10,000 to 300,000. A weight average molecular weight of equal to or greater than 10,000 is desirable in that good storage properties can be achieved in a coating layer formed using the radiation-curable functional group-containing vinyl chloride resin as binder. Further, a weight average molecular weight of equal to or less than 500,000 is desirable in that good dispersion can be achieved.

The molecular weight distribution (Mw/Mn) of the above radiation-curable functional group-containing vinyl chloride resin is desirably 1.00 to 5.50, preferably 1.01 to 5.40. A molecular weight distribution of equal to or lower than 5.5 is desirable in that there is little composition distribution and good dispersion can be achieved. The weight average molecular weight and molecular weight distribution (Mw/Mn) normally change little before and after the reaction incorporating a radiation-curable functional group and/or polar group into the vinyl chloride resin.

(b) Glass Transition Temperature

The glass transition temperature (Tg) of the radiation-curable functional group-containing vinyl chloride resin is desirably a value of 30° C. to 150° C., preferably 50° C. to 130° C., as measured by the method described in Examples further below. A glass transition temperature of equal to or higher than 30° C. is desirable in that it permits the formation of a strong coating by radiation curing and makes it possible to obtain a coating affording good durability and storage properties. When employing the composition of the present invention to prepare a coating liquid for use in a magnetic recording medium, the glass transition temperature of the radiation-curable functional group-containing vinyl chloride resin contained is desirably equal to or lower than 150° C. because calender moldability will be good even when calendering is conducted after radiation curing and a magnetic recording medium will be obtained with good electromagnetic characteristics. As set forth above, the presence of component A does not greatly affect the glass transition temperature of the coating that is obtained. Thus, radiation curing the composition of the present invention containing a radiation-curable functional group-containing vinyl chloride resin having the above desirable glass transition temperature along with component A makes it possible to form a coating with a glass transition temperature (Tg) of 30° C. to 150° C., even 50° C. to 130° C., as measured by the method described in Examples further below. Still further, it is possible to obtain a magnetic recording medium with good durability, storage properties, and calender moldability.

(c) Polar Group Content

The radiation-curable functional group-containing vinyl chloride resin desirably contains a polar group as set forth above.

The content of the polar group in the radiation-curable functional group-containing vinyl chloride resin is desirably 1.0 mmol/kg to 3.500 mmol/kg, preferably 1.0 mmol/kg to 3.000 mmol/kg, and more preferably, 1.0 mmol/kg to 2.500 mmol/kg.

A quantity of polar groups of equal to or greater than 1.0 mmol/kg is desirable in that adequate adsorptive strength to powders such as magnetic powder can be achieved and dispersion can be good. A quantity of equal to or lower than 3.500 mmol/kg is desirable in that good solubility in solvent can be achieved. As set forth above, a polar group in the form of the sulfuric acid (salt) group denoted by general formula (a) is desirable. Examples of other polar groups are hydroxyalkyl groups, carboxylic acid (salt) groups, sulfonic acid (salt) groups, and phosphoric acid (salt) groups. —$SO_3M'$, —$PO_3M'_2$, —COOM', and —OH are desirable. Of these, —$SO_3M'$ is preferred. M' denotes a hydrogen atom or a monovalent cation. Examples of monovalent cations are alkali metals and ammonium.

(d) Hydroxyl Group Content

The radiation-curable functional group-containing vinyl chloride resin can be prepared from a vinyl chloride resin containing an active hydrogen group in the form of a hydroxyl group, and can contain hydroxyl groups (OH groups) after the incorporation of radiation-curable functional groups. The number of OH groups incorporated is desirably 1 to 100,000 per molecule, preferably 1 to 10,000 per molecule. When the number of OH groups falls within this range, dispersion can be good because solubility in solvent can be enhanced.

(e) Content of the Radiation-Curable Functional Group

The content of the radiation-curable functional group in the radiation-curable functional group-containing vinyl chloride resin is desirably 1.0 mmol/kg to 4.000 mmol/kg, preferably 1.0 mmol/kg to 3.000 mmol/kg, more preferably 1.0 mmol/kg to 2.000 mmol/kg, and still more preferably, 100 mmol/kg to 500 mmol/kg. A radiation-curable functional group content of equal to or higher than 1.0 mmol/kg is desirable in that a strong coating can be formed by radiation curing. A radiation-curable functional group content of equal to or lower than 4.000 mmol/kg is desirable in that even when calendering is conducted after radiation curing, good calender moldability can be achieved and a magnetic recording medium with good electromagnetic characteristics can be obtained using the coating liquid for forming a magnetic recording medium prepared from the composition of the present invention.

The composition of the present invention can contain a binder resin in the form of just a radiation-curable functional group-containing vinyl chloride resin, or other binder resins can be contained. For example, the combined use of a binder resin contributing to enhancing dispersion can help compensate for the lower dispersion due to the presence of a large quantity of component A. An example of such a binder resin is the polyurethane resin obtained using a starting material in the form of a sulfonic acid (salt) group-containing polyol compound described in Japanese Unexamined Patent Publication (KOKAI) No. 2009-96798, which is expressly incorporated herein by reference in its entirety.

The composition of the present invention can contain components to enhance the storage stability of the composition in addition to the various above components. Examples of such components are benzoquinone compounds. Benzoquinone compounds are components that contribute to enhancing the storage stability of radiation-curable functional group-containing vinyl chloride resins without compromising curability by irradiation with radiation following storage.

The benzoquinone compound is a compound comprising a benzoquinone skeleton. The benzoquinone skeleton contained therein can be the o-benzoquinone skeleton or p-benzoquinone skeleton. From the perspective of availability, the benzoquinone skeleton is desirably a compound comprising a p-benzoquinone skeleton. The benzoquinone skeleton in the benzoquinone compound may be substituted or unsubstituted. Examples of substituents (which may themselves be substituted) are alkyl groups, alkoxyl groups, hydroxyl groups, halogen atoms, aryl groups, cyano groups, nitro groups, and any of the substituents contained in Example compounds indicated below. Further, the benzoquinone compound employed may have one, two, or more benzoquinone skeletons. Example compounds given below are examples of desirable benzoquinone compounds.

(1)
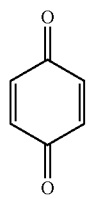

(2)
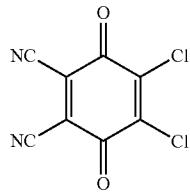

(3)
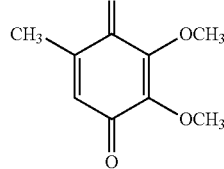

(4)
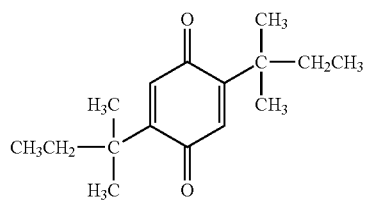

-continued (5)
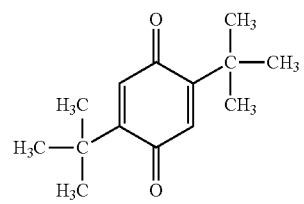

(6)
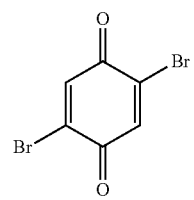

(7)
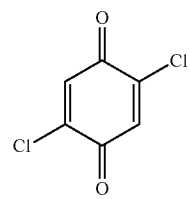

(8)
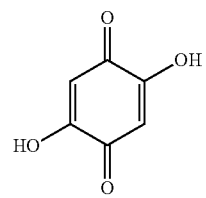

(9)
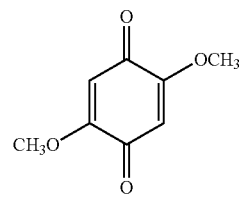

(10)
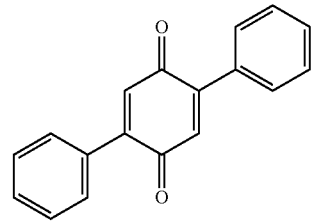

(11)
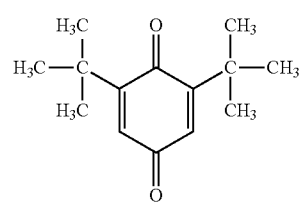

-continued
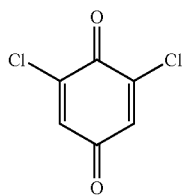
(12)
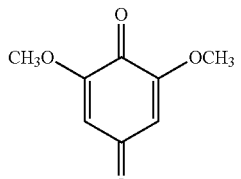
(13)
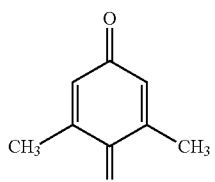
(14)
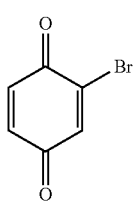
(15)
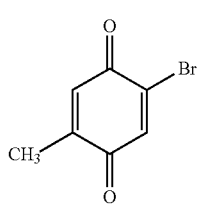
(16)
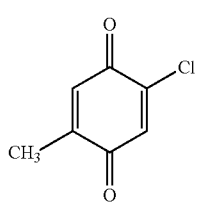
(17)
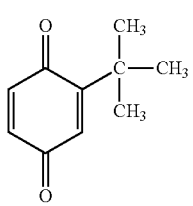
(18)
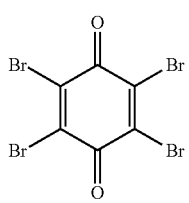
(19)
-continued
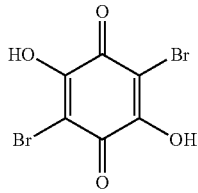
(20)
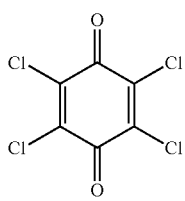
(21)
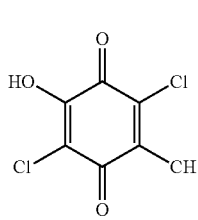
(22)
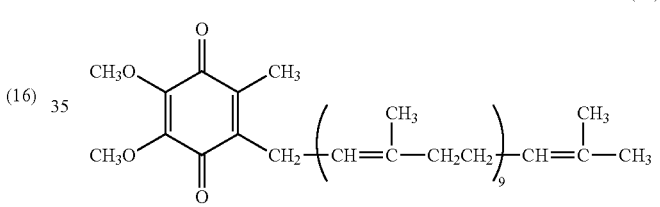
(23)
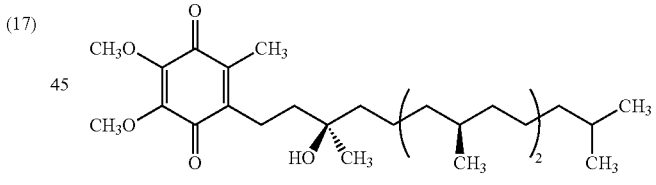
(24)
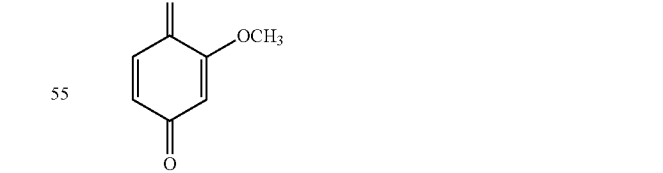
(25)
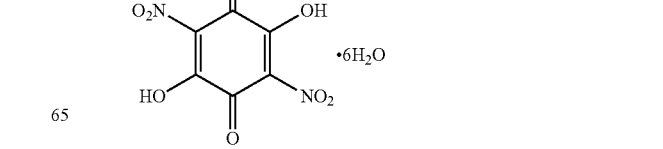
(26)

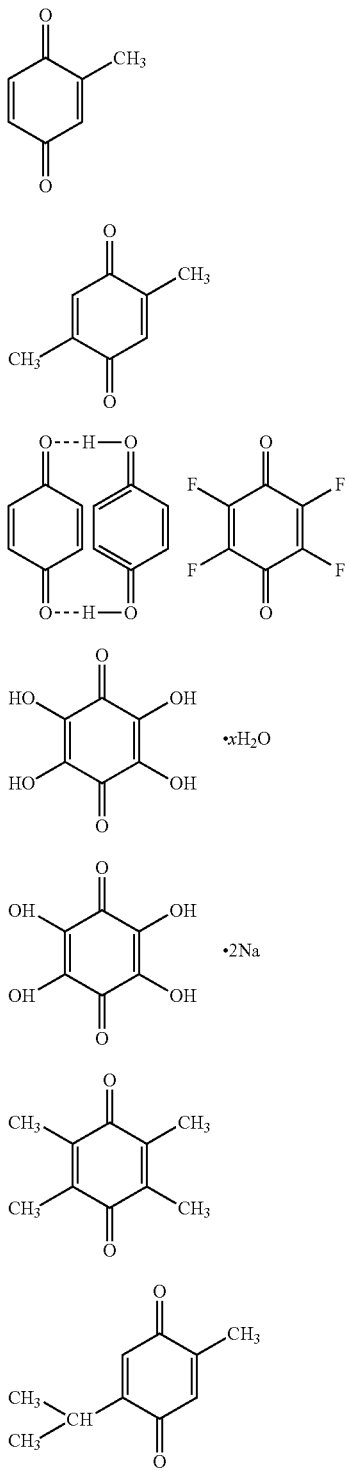

Of the above Example Compounds, Example Compounds (1) to (22) and (25) to (33) are desirable; (1) to (22), (25) to (28), (30), (32), and (33) are preferred; and compounds (1) to (22), (25) to (28), (30), and (32) are of greater preference.

The composition of the present invention can contain one, or a combination of two or more, benzoquinone compounds.

From the perspective of achieving both long-term storage stability and curability, the content of the benzoquinone compound (the combined quantity when multiple benzoquinone compounds are employed) in the composition of the present invention is desirably equal to or more than 1 ppm and equal to or less than 500,000 ppm, preferably equal to or more than 1 ppm and equal to or less than 400,000 ppm, and more preferably, equal to or more than 100 ppm and equal to or less than 100,000 ppm, relative to the solid component of the radiation-curable functional group-containing vinyl chloride resin. In addition to benzoquinone compounds, at least one compound selected from the group consisting of phenol compounds, piperidine-1-oxyl compounds, nitro compounds, and phenothiazine compounds can be incorporated, for example. These compounds can be used in combination with a benzoquinone compound to contribute to achieving both long-term storage stability and curability in the radiation-curable functional group-containing vinyl chloride resin. From the perspective of achieving long-term storage stability and curability, the content of the compound (the combined content when multiple compounds are employed) employed in combination in the composition of the present invention is desirably equal to or more than 1 ppm and equal to or less than 500,000 ppm, preferably equal to or more than 1 ppm and equal to or less than 400,000 ppm, and more preferably, equal to or more than 1 ppm and equal to or less than 300,000 ppm, relative to the solid component of the radiation-curable functional group-containing vinyl chloride resin.

The concentration of the solid component in the composition of the present invention is not specifically limited. The concentration of equal to or higher than 10 weight percent is desirable and a 100 percent solid component is acceptable. From the perspectives of storage stability and ease of handling, the solid component concentration is desirably about 10 to 80 weight percent, preferably about 20 to 60 weight percent.

The various components contained in the composition of the present invention as set forth above can be synthesized by known methods or the above-described methods. They are also available as commercial products.

Method of Manufacturing Binder Resin Composition for Magnetic Recording Medium

The present invention further relates to a method of manufacturing the binder resin composition for a magnetic recording medium of the present invention, comprising:

reacting a vinyl chloride resin containing an active hydrogen group within the molecule thereof with 2-methacryloyloxyethyl isocyanate to obtain the vinyl chloride resin containing a radiation-curable functional group in the form of a methacryloyloxy group; and causing the methacrylate compound denoted by formula (A) to be produced in the reaction. The details thereof are as set forth above.

Magnetic Recording Medium

The magnetic recording medium of the present invention comprises a magnetic layer containing a ferromagnetic powder and a binder on a nonmagnetic support, and has a radiation-cured layer that has been formed by radiation-curing a coating layer containing the binder resin composition for a magnetic recording medium of the present invention.

As set forth above, the composition of the present invention permits the formation of a coating of high strength and suitable flexibility. Thus, the magnetic recording medium of the present invention having such a coating (radiation-cured layer) can afford good running durability. The radiation-cured layer formed of the binder resin composition for a magnetic recording medium of the present invention can be the above magnetic layer, or can be a nonmagnetic layer, described further below.

The magnetic recording medium of the present invention will be described in greater detail below.

Binder

An example of the binder contained in the magnetic layer and nonmagnetic layer is the resin component obtained by curing by irradiation the binder resin composition for a magnetic recording medium of the present invention. Other binders may be employed in combination with the above resin component as the binder contained in the magnetic layer and nonmagnetic layer. Examples of the binders that are employed in combination are vinyl chloride resins; polyurethane resins; polyester resins; polyamide resins; acrylic resins copolymerized with styrene, acrylonitrile, methyl methacrylate, or the like; cellulose resins such as nitrocellulose resin; epoxy resins; phenoxy resins; and polyvinyl alkyral resins such as polyvinyl acetal and polyvinyl butyral.

When the magnetic recording medium of the present invention comprises a layer other than the above radiation-cured layer, the above binders can be employed as the binder in such a layer, for example. Desirable binders among those listed above are polyurethane resins, acrylic resins, cellulose resins, and vinyl chloride resin. In addition to the above binders, a curing agent such as polyisocyanate can be employed. Reference can be made to [0081] to [0094] in Japanese Unexamined Patent Publication (KOKAI) No. 2009-96798 for details regarding binder resins and curing agents suitable for use in the magnetic recording medium of the present invention.

From the perspectives of both the fill rate of ferromagnetic powder and the strength of the magnetic layer, the content of binder in the magnetic layer is desirably equal to or more than 5 weight parts and equal to or less than 30 weight parts, preferably equal to or more than 10 weight parts and equal to or less than 20 weight parts, per 100 weight parts of ferromagnetic powder. The same holds true for the quantity of binder employed in the nonmagnetic layer.

Magnetic Layer (i) Ferromagnetic Powder

The magnetic recording medium of the present invention comprises a ferromagnetic powder together with a binder, in the magnetic layer. Acicular ferromagnetic powder, platelike magnetic powder, spherical magnetic powder, or elliptical magnetic powder can be employed as the ferromagnetic powder. From the perspective of high-density recording, the average major axis length of the acicular ferromagnetic powder is desirably equal to or greater than 20 nm but equal to or lower than 50 nm and preferably equal to or greater than 20 nm but equal to or lower than 45 nm. The average plate diameter of the platelike magnetic powder is preferably equal to or greater than 10 nm but equal to or less than 50 nm as a hexagonal plate diameter. When employing a magnetoresistive head in reproduction, a plate diameter equal to or less than 40 nm is desirable to reduce noise. A plate diameter within the above range can yield stable magnetization without the effects of thermal fluctuation, and permit low noise, that is suited to the high-density magnetic recording. From the perspective of high-density recording, the average diameter of the spherical magnetic powder or elliptical magnetic powder is desirably equal to or greater than 10 nm but equal to or lower than 50 nm.

The average particle size of the ferromagnetic powder can be measured by the following method.

Particles of ferromagnetic powder are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle sizes measured by the above method is adopted as an average particle size of the ferromagnetic powder.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter).

Reference can be made to [0097] to [0110] of Japanese Unexamined Patent Publication (KOKAI) No. 2009-96798 for the details of the above-described magnetic powders.

(ii) Additives

Additives may be added to the magnetic layer as needed. Examples of such additives are: abrasives, lubricants, dispersing agents, dispersing adjuvants, antifungal agents, antistatic agents, oxidation inhibitors, and solvents. Reference can be made to to [0115] of Japanese Unexamined Patent Publication (KOKAI) No. 2009-96798 for the details, such as specific examples, of the additives.

Carbon black may be added to the magnetic layer as needed. Examples of types of carbon black that are suitable for use in the magnetic layer are: furnace black for rubber, thermal for rubber, black for coloring, and acetylene black. It is preferable that the specific surface area is 100 to 500 $m^2/g$ (more preferably 150 to 400 $m^2/g$), the DBP oil absorption capacity is 20 to 400 ml/100 g (more preferably 30 to 200 ml/100 g), the particle diameter is 5 to 80 nm (more preferably 10 to 50 nm), the pH is 2 to 10, the moisture content is 0.1 to 10 percent, and the tap density is 0.1 to 1 g/ml. For example, the *Carbon Black Handbook* compiled by the Carbon Black Association, which is expressly incorporated herein by reference in its entirety, may be consulted for types of carbon black suitable for use in the magnetic layer. These carbon blacks are commercially available.

The types and quantities of the additives employed in the magnetic layer may differ from those employed in the nonmagnetic layer, described further below, in the present invention. All or some part of the additives employed in the present invention can be added in any of the steps during the manufacturing of coating liquids for the magnetic layer and nonmagnetic layer. For example, there are cases where they are mixed with the ferromagnetic powder prior to the kneading step; cases where they are added during the step in which the ferromagnetic powder, binder, and solvent are kneaded; cases where they are added during the dispersion step; cases where they are added after dispersion; and cases where they are added directly before coating.

Nonmagnetic Layer

The magnetic recording medium of the present invention can have a magnetic layer directly on the nonmagnetic support, or can have a nonmagnetic layer containing a nonmagnetic powder and a binder between the nonmagnetic support and the magnetic layer. When the magnetic recording medium of the present invention comprises a nonmagnetic layer, it is desirably the radiation-cured layer. When the nonmagnetic layer is the radiation-cured layer, irradiation with radiation can cause the radiation-curable components in the nonmagnetic layer to polymerize and crosslink, generating a high molecular weight. That in turn can inhibit the nonmagnetic layer from dissolving into the solvent contained in the magnetic layer coating liquid and fluctuating the boundary face. The composition of the present invention as set forth above permits the forming of a coating of high strength and suitable flexibility. Thus, the use of a nonmagnetic layer in the form of the radiation-cured layer formed with the composition of the present invention is advantageous to forming a medium having good running durability.

The nonmagnetic powder can be an organic or inorganic substance. Examples of inorganic substances are: metals, metal oxides, metal carbonates, metal sulfates, metal nitrides, metal carbides, and metal sulfides. Carbon black may also be employed. These nonmagnetic powders are commercially available and can be manufactured by known methods.

Specifically, titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped.

The crystallite size of the nonmagnetic powder preferably ranges from 4 nm to 1 μm, more preferably from 40 to 100 nm. The crystallite size within 4 nm to 1 μm can achieve good dispersibility and suitable surface roughness.

The average particle diameter of the nonmagnetic powder preferably ranges from 5 nm to 2 μm. As needed, nonmagnetic powders of differing average particle diameter may be combined; the same effect may be achieved by broadening the average particle distribution of a single nonmagnetic powder. The particularly preferred average particle diameter of the nonmagnetic powder ranges from 10 to 200 nm. Reference can be made to [0123] to [0132] of Japanese Unexamined Patent Publication (KOKAI) No. 2009-96798 for the nonmagnetic powder suitable for use in the magnetic recording medium of the present invention.

Carbon black may be combined with nonmagnetic powder in the nonmagnetic layer to reduce surface resistivity, reduce light transmittance, and achieve a desired micro-Vickers hardness. The micro-Vickers hardness of the nonmagnetic layer is normally 25 to 60 $kg/mm^2$, desirably 30 to 50 $kg/mm^2$ to adjust head contact. It can be measured with a thin film hardness meter (HMA-400 made by NEC Corporation) using a diamond triangular needle with a tip radius of 0.1 micrometer and an edge angle of 80 degrees as indenter tip. The light transmittance is generally standardized to an infrared absorbance at a wavelength of about 900 nm equal to or less than 3 percent. For example, in VHS magnetic tapes, it has been standardized to equal to or less than 0.8 percent. To this end, furnace black for rubber, thermal black for rubber, black for coloring, acetylene black and the like may be employed.

The specific surface area of the carbon black employed in the nonmagnetic layer is desirably 100 to 500 $m^2/g$, preferably 150 to 400 $m^2/g$. The DBP oil absorption capability is desirably 20 to 400 mL/100 g, preferably 30 to 200 mL/100 g. The particle diameter of the carbon black is preferably 5 to 80 nm, preferably 10 to 50 nm, and more preferably, 10 to 40 nm. It is preferable that the pH of the carbon black is 2 to 10, the moisture content is 0.1 to 10 percent, and the tap density is 0.1 to 1 g/mL. For example, the *Carbon Black Handbook* compiled by the Carbon Black Association, which is expressly incorporated herein by reference in its entirety, may be consulted for types of carbon black suitable for use in the nonmagnetic layer. These carbon blacks are commercially available.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above publications are expressly incorporated herein by reference in their entirety.

Binder resins, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersion agents employed in the magnetic layer may be adopted thereto.

Nonmagnetic Support

A known film such as a biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The surface roughness of the nonmagnetic support employed in the present invention preferably ranges from 3 to 10 nm, as a center average roughness Ra at a cutoff value of 0.25 mm.

Smoothing Layer

A smoothing layer can be provided in the magnetic recording medium of the present invention. A "smoothing layer" is a layer for burying protrusions on the surface of the nonmagnetic support. In the case of a magnetic recording medium with a magnetic layer on a nonmagnetic support, it can be positioned between the nonmagnetic support and the magnetic layer, and in the case of a magnetic recording medium with a nonmagnetic layer and a magnetic layer sequentially provided on a nonmagnetic support, it can be positioned between the nonmagnetic support and the nonmagnetic layer.

The smoothing layer can be formed by curing a radiation-curable compound by irradiation with radiation.

The "radiation-curable compound" refers to a compound that has the properties of beginning to undergo polymerization or crosslinking when irradiated with radiation such as ultraviolet radiation or an electron beam, and curing into a polymer. The composition of the present invention can be employed to form the smoothing layer.

Backcoat Layer

Generally, a magnetic tape used for computer data recording will be required to have better repeat running properties than a video tape or an audio tape. To maintain such a high degree of storage stability, a backcoat layer can be provided on the opposite surface of the nonmagnetic support from the surface on which the magnetic layer is provided. The backcoat layer coating liquid can be formed by dispersing particulate components such as an abrasive, an antistatic agent, and the like and binder in an organic solvent. Various inorganic pigments, carbon black, and the like can be employed as the particulate components. Resins such as nitrocellulose, phenoxy resin, vinyl chloride resin, and polyurethane can be employed singly or in combination as the binder. The composition of the present invention can be used to form the backcoat layer.

Layer Structure

In the magnetic recording medium of the present invention, the thickness of the nonmagnetic support desirably ranges from 3 to 80 µm. When the above smoothing layer is provided between the nonmagnetic support and the nonmagnetic layer or the magnetic layer, the thickness of the smoothing later desirably ranges from 0.01 to 0.8 µm, and preferably 0.02 to 0.6 µm. The thickness of the above backcoat layer is, for example, 0.1 to 1.0 µm, and desirably 0.2 to 0.8 µm.

The thickness of the magnetic layer is desirably optimized based on the saturation magnetization of the head employed, the length of the head gap, and the recording signal band, and is normally 0.01 to 0.10 µm, preferably 0.02 to 0.08 µm, and more preferably, 0.03 to 0.08 µm. The thickness variation in the magnetic layer is preferably within ±50 percent, more preferably within ±40 percent. At least one magnetic layer is sufficient. The magnetic layer may be divided into two or more layers having different magnetic characteristics, and a known configuration relating to multilayered magnetic layer may be applied.

The thickness of the nonmagnetic layer is desirably 0.2 to 3.0 µm, preferably 0.3 to 2.5 µm, and further preferably, 0.4 to 2.0 µm. The nonmagnetic layer is effective so long as it is substantially nonmagnetic. For example, it exhibits the effect of the present invention even when it comprises impurities or trace amounts of magnetic material that have been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT, or a coercivity of equal to or less than 7.96 kA/m (100 Oe), it being preferable not to have a residual magnetic flux density or coercivity at all.

Manufacturing Method

The steps of manufacturing coating liquids for forming the various layers of the magnetic layer, nonmagnetic layer, etc. desirably comprise at least a kneading step, dispersing step, and a mixing step provided based on need before and after these steps. Each step can be divided into two or more stages. All of the starting materials such as ferromagnetic powder, nonmagnetic powder, binder, carbon black, abrasives, antistatic agents, lubricants, and solvents that are employed in the present invention can be added at the start of, or part way through, any step. Each of the starting materials can be divided and added in two or more steps. For example, the polyurethane can be divided into portions that are added during the kneading step, during the dispersion step, or during the mixing step to adjust the viscosity following dispersion. Further, the above starting materials can be simultaneously or successively added to the binder resin composition for a magnetic recording medium of the present invention to prepare a coating liquid. For example, powder components such as the ferromagnetic powder and nonmagnetic powder can be crushed in a kneader, the binder resin composition for a magnetic recording medium of the present invention (and as needed, any other binder components being employed in combination) can be added, the kneading step can be conducted, various additives can be added to the kneaded product, and a dispersion step can be conducted to prepare a coating liquid.

To prepare coating liquids for forming the various layers, conventionally known manufacturing techniques may be utilized for some of the steps. A kneader having a strong kneading force, such as an open kneader, continuous kneader, pressure kneader, or extruder is preferably employed in the kneading step. When a kneader is employed, the binder (preferably equal to or higher than 30 weight percent of the entire quantity of binder) can be kneaded in a range of 15 to 500 parts per 100 parts of the ferromagnetic powder or nonmagnetic powder. Details of the kneading process are described in Japanese Unexamined Patent Publication (KOKAI) Heisei Nos. 1-106338 and 1-79274, which are expressly incorporated herein by reference in their entirety. Further, glass beads may be employed to disperse the coating liquids for magnetic and nonmagnetic layers. Other than glass beads, dispersing media with a high specific gravity such as zirconia beads, titania beads, and steel beads are suitable for use. The particle diameter and fill ratio of these dispersing media can be optimized for use. A known dispersing device may be employed.

In the method of manufacturing a magnetic recording medium of the present invention, for example, a nonmagnetic layer coating liquid can be applied to the surface of a running nonmagnetic support in a quantity calculated to yield a prescribed film thickness to form a nonmagnetic layer. A magnetic layer coating liquid can then be applied thereover in a quantity calculated to yield a prescribed film thickness to form a magnetic layer. Multiple magnetic layer coating liquids can be successively or simultaneously applied in multiple layers, or the nonmagnetic layer coating liquid and the magnetic layer coating liquid can be successively or simultaneously applied in multiple layers. As set forth above, when the lower layer (nonmagnetic layer) coating liquid and the upper layer (magnetic layer) coating liquid are applied successively in multiple layers, the nonmagnetic layer will sometimes partially dissolve into the solvent contained in the magnetic layer coating liquid. When the nonmagnetic layer is a radiation-cured layer, the radiation-curable component in the nonmagnetic layer is polymerized or crosslinked by irradiation with radiation to achieve a high molecular weight, so dissolution into the solvent contained in the magnetic layer coating liquid can be inhibited or reduced. Accordingly, when successively applying the lower nonmagnetic layer coating liquid and the upper magnetic layer coating liquid to form multiple layers, it is desirable to conduct irradiation with radiation before applying the upper magnetic layer coating liquid and then form the magnetic layer over the cured nonmagnetic layer. The nonmagnetic layer coating liquid employed in this case is desirably prepared using the composition of the present invention.

The radiation that is irradiated in the curing reaction can be, for example, an electron beam or UV radiation. The use of an electron beam is desirable in that no polymerization initiator is required. The radiation can be irradiated by a known method. For the details, reference can be made to [0021] to [0023] in Japanese Unexamined Patent Publication (KOKAI) No. 2009-134838, for example. The content of the above publication is expressly incorporated herein by reference in its entirety. Known techniques such as those described in "UV•EB Curing Techniques" (published by the Sogo Gijutsu Center (Ltd.)), "Applied Techniques in Low-energy Electron Beam Irradiation" (2000, published by CMC (Ltd.)), and the like can be used for the radiation curing device and method of curing by irradiation. The contents of the above publications are expressly incorporated herein by reference in their entirety.

The coating machine used to apply the magnetic layer coating liquid or nonmagnetic layer coating liquid can be an air doctor coater, blade coater, rod coater, extrusion coater, air knife coater, squeeze coater, dip coater, reverse roll coater, transfer roll coater, gravure coater, kiss coater, cast coater, spray coater, spin coater or the like. Reference can be made to the "Most Recent Coating Techniques" (May 31, 1983) released by the Sogo Gijutsu Center (Ltd.), which is expressly incorporated herein by reference in its entirety, for these coating machines. In the course of forming a radiation-cured layer, the coating layer that has been formed by coating the coating liquid is irradiated with radiation to cure it. The details of the processing by irradiation with radiation are as set forth above. Following the coating step, the medium can be subjected to various post-processing, such as processing to orient the magnetic layer, processing to smoothen the surface (calendering), and thermoprocessing to reduce heat contraction. Reference can be made to [0146] to [0148] of Japanese Unexamined Patent Publication (KOKAI) No. 2009-96798, for example, with regard to this processing. The magnetic recording medium that is obtained can be cut to prescribed size with a cutter, puncher, or the like for use.

In the magnetic recording medium of the present invention having both a magnetic layer and a nonmagnetic layer, physical properties of the nonmagnetic layer and magnetic layer may be varied based on the objective. For example, the modulus of elasticity of the magnetic layer may be increased to improve storage stability while simultaneously employing a lower modulus of elasticity than that of the magnetic layer in the nonmagnetic layer to improve the head contact of the magnetic recording medium.

EXAMPLES

The present invention will be described in detail below based on Examples. However, the present invention is not limited to the examples. The "parts" and "percent" given in Examples are weight parts and weight percent unless specifically stated otherwise.

The evaluation methods employed in Examples, Comparative Examples, and Reference Examples are set forth below. The $^1$H NMR measurements described below were carried out by 400 MHz NMR (AVANCE II-400 made by BRUKER) with a deuterated DMSO solvent.

Evaluation Methods (1) Measurement of Average Molecular Weight

The average molecular weights (Mw, Mn) of the radiation-curable resins contained in the various resin solutions of Examples and Comparative Examples were obtained by gel permeation chromatography (GPC) using a DMF solvent containing 0.3 percent lithium bromide with standard polystyrene conversion.

(2) Sulfuric Acid (Salt) Group Concentration

The quantity of elemental sulfur was determined from the area of the elemental sulfur (S) peak in X-ray fluorescence analysis and converted to the quantity of elemental sulfur per kilogram of radiation-curable functional group-containing resin to obtain the concentration of sulfuric acid (salt) groups in the radiation-curable resin.

(3) Measurement of Glass Transition Temperature (Tg)

The resin composition was diluted with a solution of a 50:50 (weight) ratio of methyl ethyl ketone:cyclohexanone and adjusted to a solid component concentration of 22 weight percent. Subsequently, the mixture was coated on an aramid base so as to achieve a dry thickness of 20 μm and dried, yielding a clear film. The clear film containing the radiation-curable resin was cured by irradiation with 40 kGy of radiation in an atmosphere with an oxygen concentration not exceeding 200 ppm oxygen. Subsequently, the clear film obtained was cut to a width of 3.35 mm and a length of 5 cm. A dynamic viscoelastic measurement device (Rheovibron made by Toyo Baldwin, rate of temperature increase 2° C./minute, measurement frequency 110 Hz) was used to measure the peak temperature of the loss modulus (E") from 30 to 140° C. as the glass transition temperature of the binder resin (Tg, hereinafter).

(4) Content of Radiation-Curable Functional Groups in Resin
  Calculated based on the integral ratio in NMR.

(5) Evaluation of Radiation Curability

Each of the resin solutions obtained was diluted to a solid component concentration of about 20 percent to prepare a sample solution. The sample solution was coated with a blade (300 μm) on an aramid base and dried for two weeks at room temperature to obtain a coating film 30 to 50 μm in thickness.

Next, an electron beam illuminator was used to irradiate the coating film three times at an intensity of 10 kG for a total of 30 kG.

Next, the film that had been irradiated with the electron beam was immersed in 100 mL of tetrahydrofuran (THF) and extracted for 2 hours at 60° C. Following extraction, the film was washed with 100 mL of THF and dried for 3 hours at 140° C. under a vacuum. Next, the weight of the residue (of the dried film) following extraction was adopted as the weight of the gel fraction, and the value calculated as the (weight of gel fraction/weight of coating film prior to extraction)×100 was adopted as the gel content indicated in Table 1. The higher the gel content, the greater the strength of the coating and the smoother the radiation curing progressed.

1. Examples and Comparative Examples of the Binder Resin Composition (Resin Solution) for a Magnetic Recording Medium Example 1

(1) Preparation of Vinyl Chloride Resin Composition

To a two-liter flask were charged 416 g of 30 percent cyclohexanone solution (solid component 124.8 g) of sulfate group and epoxy group-containing vinyl chloride copolymer (MR-104, water content 0.10 percent, made by Zeon Corporation) and the mixture was stirred at a rate of 210 rpm. Next, 0.5 g (4.464 mmol) of 1,4-benzoquinone was added and dissolved by stirring.

Next, a reaction catalyst in the form of 0.125 g of dibutyltin dilaurate was added, the temperature was raised to 40 to 50° C., and the mixture was stirred. Next, a radiation-curable functional group-incorporating component in the form of 13.75 g (0.09 mol) of 2-methacryloyloxyethyl isocyanate (MOI, made by Showa Denko K.K.) was added dropwise over 30 minutes. When the dropwise addition had been completed, the mixture was stirred for 2 hours at 40° C. and cooled to room temperature, yielding a resin solution containing a radiation-curable functional group•(methacryloyloxy group)-containing vinyl chloride copolymer. The $^1$H NMR data and assignments for the radiation-curable functional group (methacryloyloxy group)-containing vinyl chloride copolymer are given below.

Radiation-curable functional group-containing vinyl chloride copolymer (A):

$^1$H-NMR (DMSO-$d_6$) δ (ppm)=6.2-6.0 (peak of C=C double bond), 5.8-5.6 (peak of C=C double bond), 4.6-4.2 (br., m), 4.1-4.0 (m), 3.9-3.2 (m), 3.1 (br., s), 2.7 (br., s), 2.6-2.0 (m), 2.0-0.8 (br., m).

The solid component of the resin solution obtained through the above steps was 31.3 percent. Within one day of preparing the above resin solution, the weight average molecular weight (Mw) and number average molecular weight (Mn) of the radiation-curable group-containing vinyl chloride copolymer contained in the solution were calculated by the above method at Mw=51,000 and Mn=29,000. The glass transition temperature (Tg) of the resin solution obtained, the sulfate group concentration of the radiation-curable functional group-containing vinyl chloride copolymer, and the methacryloyloxy group concentration were measured by the above methods at Tg=75° C., sulfate group concentration=70 mmol/kg, and methacryloyloxy group concentration=339 mmol/kg. The gel content was 85 percent.

(2) Synthesis of the Methacrylate Compound (Component A) Denoted by Formula (A)

A 10 g quantity of 2-methacryloyloxyethyl isocyanate (MOI made by Showa Denko K.K.) was dissolved in 100 mL of acetone. Within an internal temperature range of 30 to 50° C., 100 mg of water was added dropwise and the mixture was stirred for 2 hours. A 200 g quantity of ethyl acetate was added, the mixture was stirred for 10 minutes and then left standing, and the aqueous phase was discarded. The organic phase thus obtained was concentrated and dried in an evaporator at an external temperature of 40° C. The NMR data of the product and the assignments thereof are given below.

$^1$H-NMR (400 MHz, DMSO, 25° C.): 6.12 (2H, t), 6.05 (2H,$), 5.68 (2H, t), 4.05 (4H, t), 3.82 (4H, q), 1.88 (6H, s) ppm

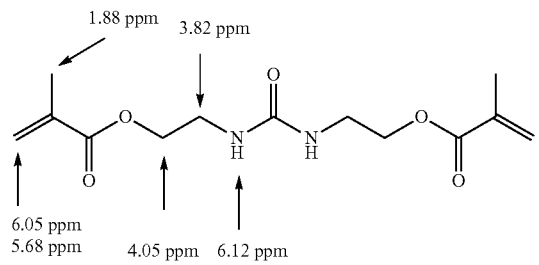 [SMILES: C=C(C)C(=O)OCCNC(=O)NCCOC(=O)C(=C)C]

(3) Confirming the Production of Component A

In the NMR data of the 2-methacryloyloxyethyl isocyanate, the assignment of typical protons was as follows. As will be clear from the NMR data for radiation-curable functional group-containing vinyl chloride copolymer (A), component A, and 2-methacryloyloxyethyl isocyanate, since only component A exhibited a proton peak at 6.12 ppm, it was possible to use the presence of this peak to confirm the production of component A. Accordingly, $^1$H NMR measurement of the resin solution obtained in Example 1 confirmed a 6.12 ppm proton peak. Based on this result, the production of component A in Example 1 was confirmed.

The contents of radiation-curable functional group-containing vinyl chloride copolymer (A) and component A in the resin solution obtained in Example 1 can be calculated according to the following method. By comparing the value of integral of radiation-curable functional group-containing vinyl chloride copolymer (A) with that of component A in the NMR data, the ratio of the quantity of 2-methacryloyloxyethyl isocyanate incorporated into radiation-curable functional group-containing vinyl chloride copolymer (A) to the quantity incorporated into component A revealed the ratio of the former:latter=47.8:52.2. No unreacted 2-methacryloyloxyethyl isocyanate was detected. From these results and quantities charged, the content of radiation-curable functional group-containing vinyl chloride copolymer (A) and that of component A were calculated as the values given in Table 1.

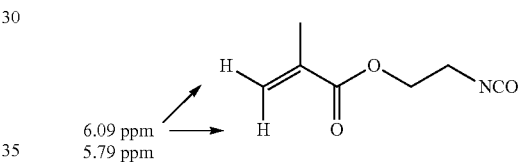

As set forth above, the generation of component A was confirmed in Example 1. However, the presence of component A did not greatly affect the radiation curability or glass transition temperature of the radiation-curable composition. To demonstrate this point, a resin solution not containing component A was prepared by the following method as Comparative Example 1.

Comparative Example 1

A resin solution was obtained by the same method as in Example 1. To 200 g of the resin solution obtained was added 200 g of acetone at an internal temperature of 50° C. Subsequently, 500 g of methanol was added dropwise within an internal temperature range of 45 to 55° C., causing a solid product to precipitate. The solid product that precipitated was filtered out, 300 g of acetone was added and the mixture was thoroughly dissolved by stirring at 50° C. Within an internal temperature range of 45 to 55° C., 500 g of methanol was added dropwise, causing a solid product to precipitate out. The solid product that precipitated was filtered out and dried for 24 hours at 30° C. under a vacuum.

The products obtained by the above operations were measured by $^1$H NMR, confirming the absence of a proton peak at 6.12 ppm. Based on these results, it was determined that the above operations resulted in a reaction product from which component A had been eliminated.

Next, the radiation curability and glass transition temperature of the product obtained by the above operations were measured by the methods set forth above. The gel content was 84 percent and the glass transition temperature was 75° C. These results were equivalent to those obtained in Example 1.

Based on these results, it was confirmed that the component A generated during synthesis did not greatly affect the radiation curability or glass transition temperature of the radiation-curable composition.

Examples of the synthesis of radiation-curable functional group-containing vinyl chloride copolymers (A)' and (A)" of differing methacryloyloxy group concentrations from the radiation-curable functional group-containing vinyl chloride copolymer (A) obtained in Example 1 will be given next.

Example 2

Synthesis of Radiation-Curable Functional Group-Containing Vinyl Chloride Copolymer (A)'

With the exception that the quantity of 2-methacryloyloxyethyl isocyanate that was added dropwise was changed to 6.88 g (0.04 mol), a resin solution containing radiation-curable functional group-containing vinyl chloride copolymer (A)' was obtained by the same method as in Example 1. The generation of component A was confirmed by the same method as above for the resin solution obtained.

In the same manner as in Example 1, the contents of component A and radiation-curable functional group-containing vinyl chloride copolymer (A)' in the resin solution were calculated by the following method. In the NMR data, a comparison of the integral values of radiation-curable functional group-containing vinyl chloride copolymer (A)' and component A revealed that the ratio of the quantity of 2-methacryloyloxyethyl isocyanate incorporated into radiation-curable functional group-containing vinyl chloride copolymer (A)' and the quantity incorporated into component A was: former:latter=63.5:36.5. No unreacted 2-methacryloyloxyethyl isocyanate was detected. Based on these results and the quantities charged, calculation of the contents of component A and radiation-curable functional group-containing vinyl chloride copolymer (A)' revealed the values given in Table 1.

The results of calculating the methacryloyloxy group concentration in radiation-curable functional group-containing vinyl chloride copolymer (A)' and the glass transition temperature of the resin solution are given in Table 1.

Example 3

Synthesis of Radiation-Curable Functional Group-Containing Vinyl Chloride copolymer (A)"

With the exception that the quantity of 2-methacryloyloxyethyl isocyanate that was added dropwise was changed to 3.43 g (0.02 mol), a resin solution containing radiation-curable functional group-containing vinyl chloride copolymer (A)" was obtained by the same method as in Example 1. The generation of component A was confirmed by the same method as above for the resin solution obtained.

In the same manner as in Example 1, the contents of component A and radiation-curable functional group-containing vinyl chloride copolymer (A)" in the resin solution were calculated by the following method. In the NMR data, a comparison of the integral values of radiation-curable functional group-containing vinyl chloride copolymer (A)" and component A revealed that the ratio of the quantity of 2-methacryloyloxyethyl isocyanate incorporated into radiation-curable functional group-containing vinyl chloride copolymer (A)" and the quantity incorporated into component A was: former:latter=77.4:22.6. No unreacted 2-methacryloyloxyethyl isocyanate was detected. Based on these results and the quantities charged, calculation of the contents of component A and radiation-curable functional group-containing vinyl chloride copolymer (A)" revealed the values given in Table 1.

The results of calculating the methacryloyloxy group concentration in radiation-curable functional group-containing vinyl chloride copolymer (A)" and the glass transition temperature of the resin solution are given in Table 1.

Example 4

With the exception that 30 weight percent of the sulfate group-containing vinyl chloride copolymer was changed from MR-104 made by Zeon Corporation to MR110 (water content 0.11 percent) made by Zeon Corporation, a resin solution containing radiation-curable functional group (methacryloyloxy group)-containing vinyl chloride copolymer and component A was prepared by the same method as in Example 1.

The resin solution obtained was subjected to measurement and evaluated by the same methods as those set forth above. The results are given in Table 1.

Example 5

With the exception that 30 weight percent of the sulfate group and epoxy group-containing vinyl chloride copolymer was changed from MR-104 made by Zeon Corporation to MR110 (water content 0.11 percent) made by Zeon Corporation, a resin solution containing radiation-curable functional group (methacryloyloxy group)-containing vinyl chloride copolymer and component A was prepared by the same method as in Example 2.

The resin solution obtained was subjected to measurement and evaluated by the same methods as those set forth above. The results are given in Table 1.

Example 6

With the exception that 30 weight percent of the sulfate group and epoxy group-containing vinyl chloride copolymer was changed from MR-104 made by Zeon Corporation to MR110 (water content 0.11 percent) made by Zeon Corporation, a resin solution containing radiation-curable functional group (methacryloyloxy group)-containing vinyl chloride copolymer and component A was prepared by the same method as in Example 3.

The resin solution obtained was subjected to measurement and evaluated by the same methods as those set forth above. The results are given in Table 1.

TABLE 1

| | Content of methacryloyloxy group-containing vinyl chloride copolymer in resin solution (g) | Content of component A in resin solution (g) | Ratio of component A relative to content of methacryloyloxy group-containing vinyl chloride copolymer in resin solution (wt. %) | Glass transition temp. of resin solution (° C.) | Content of methacryloyloxy group in vinyl chloride copolymer (mmol/kg) |
|---|---|---|---|---|---|
| Ex. 1 | 131.98 | 7.18 | 5.44 | 75 | 339 |
| Ex. 2 | 127.31 | 2.51 | 1.97 | 73 | 225 |
| Ex. 3 | 125.58 | 0.78 | 0.62 | 75 | 137 |

TABLE 1-continued

| | Content of methacryloyloxy group-containing vinyl chloride copolymer in resin solution (g) | Content of component A in resin solution (g) | Ratio of component A relative to content of methacryloyloxy group-containing vinyl chloride copolymer in resin solution (wt. %) | Glass transition temp. of resin solution (° C.) | Content of methacryloyloxy group in vinyl chloride copolymer (mmol/kg) |
|---|---|---|---|---|---|
| Ex. 4 | 132.25 | 7.45 | 5.64 | 75 | 325 |
| Ex. 5 | 127.34 | 2.54 | 2.00 | 74 | 224 |
| Ex. 6 | 125.59 | 0.79 | 0.63 | 74 | 137 |

Confirmation of Enhanced Coating Flexibility Due to Component A

A powder of component A prepared by the method set forth above was added to a product (resin powder not containing component A) obtained by the same method as in Comparative Example 1 in quantities yielding ratios relative to the quantity of methacryloyloxy group-containing vinyl chloride copolymer contained in the above product of 0.1, 0.3, 5.0, 10.0, and 20.0 weight percent to obtain powder mixtures. Using resin powder to which no component A had been added and the powder mixtures to which the above quantities of component A had been added, 20 weight percent cyclohexanone solutions were prepared. These solutions were coated on imide resin films, dried for one hour at 100° C. in air, and dried for 3 hours at 140° C. under a vacuum to prepare coatings. Separately, the resin solution obtained in Example 1 was used to prepare a coating by the same method.

The coatings obtained were irradiated with an electron beam in 10 kGy×5 cycles with an EB irradiation device, the Min-EB Labo, made by Ushio Inc., to cure the coatings.

The cured coatings were cut to 0.5 cm×5 cm in size, and the elongation and breaking stress were measured under conditions of a load range of 2.5 kgf and a rate of 50 mm/min with a V series Strograph, model type V1-C, made by Toyo Seiki. The results are given in Table 2.

TABLE 2

| Sample No. | Solution employed in the preparation of resin film | Ratio of component A relative to content of methacryloyloxy group-containing vinyl chloride copolymer in solution (wt. %) | Elongation (%) | Breaking stress (MPa) |
|---|---|---|---|---|
| 1 | 20 wt. % cyclohexanone solution of resin powder not containing component A | 0 | 3.60 | 51.0 |
| 2 | 20 wt. % cyclohexanone solution of powder mixture containing component A | 0.1 | 3.59 | 48.3 |
| 3 | 20 wt. % cyclohexanone solution of powder mixture containing component A | 0.3 | 4.02 | 59.7 |
| 4 | 20 wt. % cyclohexanone solution of powder mixture containing component A | 5.0 | 4.76 | 64.9 |
| 5 | Resin solution obtained in Example 1 | 5.44 | 4.80 | 63.0 |
| 6 | 20 wt. % cyclohexanone solution of powder mixture containing component A | 10 | 3.50 | 68.6 |
| 7 | 20 wt. % cyclohexanone solution of powder mixture containing component A | 20 | — | — |

Based on the results in Table 2, it was revealed that the addition of component A in a quantity of equal to or more than 0.3 weight percent but equal to or less than 10 weight percent to the radiation-curable functional group-containing vinyl chloride resin enhanced the breaking stress of the coating obtained, and adjustment of the quantity of component A added enhanced the breaking stress of the coating obtained as well as the tendency for elongation. Based on these results, the addition of a prescribed quantity of component A was confirmed to yield a coating of suitable flexibility desirable for a magnetic recording medium. As set forth above, component A did not greatly affect the glass transition temperature or gel content of the coating.

Based on the above results, it was revealed that a resin composition containing component A in an amount of equal to or more than 0.3 weight percent but equal to or less than 10 weight percent relative to the radiation-curable functional group-containing vinyl chloride resin permitted the formation of a coating of high strength and suitable flexibility.

In Sample Nos. 1 to 6 above, the presence of precipitate was not found on the surface of the coatings. However, in Sample No. 7, the formation of a coating was precluded by precipitation of component A.

2. Example of Magnetic Recording Medium

Example 7

Preparation of Magnetic Layer Coating Liquid

One hundred parts of acicular ferromagnetic powder (average major axis length 35 nm) were comminuted for 10 minutes in an open kneader, after which 15 parts based on solid of the resin solution obtained in Example 1 were added and the mixture was kneaded for 60 minutes. To the kneaded product were added two parts of abrasive ($Al_2O_3$, particle size 0.3 μm), 2 parts of carbon black (particle size 40 μm), and 200 parts of a mixed solvent of methyl ethyl ketone/toluene=1/1, and the mixture was dispersed for 360 minutes in a sand mill.

To the dispersion obtained were added 2 parts of butyl stearate, one part of stearic acid, and 50 parts of cyclohexanone. The mixture was then stirred for another 20 minutes and passed through a filter having an average pore diameter of 1 μm to prepare a magnetic layer coating liquid.

<Preparation of Nonmagnetic Layer Coating Liquid>

Eighty-five parts of α-$Fe_2O_3$ (average particle diameter 0.15 μm, $S_{BET}$ 52 m$^2$/g, surface treatment agents $Al_2O_3$, $SiO_2$, pH 6.5 to 8.0) were comminuted for 10 minutes in an open kneader. Subsequently, 7.5 parts based on solid of the resin solution obtained in Example 1, 10 parts based on solid of a radiation-curable functional group-containing polyurethane resin solution, and 60 parts of cyclohexanone were added and the mixture was kneaded for 60 minutes. To the kneaded product were added 200 parts of a mixed solvent of methyl ethyl ketone/cyclohexanone=6/4, and the mixture was dispersed for 120 minutes in a sand mill.

To the dispersion obtained were added 2 parts of butyl stearate, one part of stearic acid, and 50 parts of methyl ethyl ketone. The mixture was then stirred for another 20 minutes and passed through a filter having an average pore diameter of 1 μm to prepare a nonmagnetic layer coating liquid.

<Preparation of Magnetic Recording Medium>

An adhesive layer in the form of a sulfonic acid-containing polyester resin was coated with a coil bar so as to yield a dry thickness of 0.1 μm on the surface of a polyethylene terephthalate support 7 μM in thickness.

Next, the nonmagnetic layer coating liquid obtained was coated to a thickness of 1.5 μm over the adhesive layer to form a coating layer. The coating layer was irradiated with a 30 kG electron beam to form a nonmagnetic layer (radiation-cured layer). Immediately thereafter, the magnetic layer coating liquid was applied so as to yield a dry thickness of 0.1 μm on the nonmagnetic layer that had been formed. The nonmagnetic support upon which had been coated the magnetic coating liquid was magnetic field oriented with a 0.5 tesla (5,000 gauss) Co magnet and a 0.4 tesla (4,000 gauss) solenoid magnet while the magnetic layer coating liquid was still wet. Subsequently, the coating layer of the magnetic layer coating liquid was irradiated with a 30 kG electron beam to form a magnetic layer (radiation-cured layer). Next, calendering was conducted with a seven-stage metal roll combination at a rate of 100 m/min, a linear pressure of 300 kg/cm, and a temperature of 90° C., after which the product was slit to a width of ½ inch (17.7 mm) to obtain a magnetic tape.

<Evaluation of Running Durability>

The repeat sliding durability of the magnetic tape prepared in Example 7 was evaluated in the following method and the evaluation result was "Excellent." Based on this result, the resin solution prepared in Example 1 was found to have permitted the preparation of a magnetic recording medium with good running durability. As set forth above, that was due to the formation of coatings of high strength and suitable flexibility.

Method of Evaluating Repeat Sliding Durability

Under conditions of 40° C. and 10 percent RH, the surface of the magnetic layer was brought into contact with a round rod made of AlTiC and a load of 100 g (T1) was applied. The tape was repeatedly slid at a rate of 2 m/s until 10,000 passes had been completed. At that point, the tape damage was observed by eye and by optical microscopy (at 100 to 500-fold magnification) and evaluated on the following scale.

Excellent: Some scratching evident, but most portions free of scratches

Good: More scratched portions than unscratched portions

Poor: Complete separation of magnetic layer

The magnetic recording medium of the present invention is suitable as a backup tape in which repeat running durability is required.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A binder resin composition for a magnetic recording medium comprising a vinyl chloride resin containing a sulfuric acid group and/or a sulfate group and 100 to 500 mmol/kg of a radiation-curable functional group, wherein the radiation-curable functional group is a methacryloyloxy group, and which is characterized by comprising a methacrylate compound denoted by formula (A):

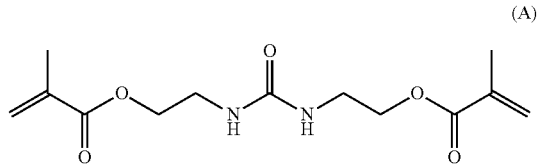 [SMILES: C=C(C)C(=O)OCCNC(=O)NCCOC(=O)C(=C)C]

(A)

in an amount of equal to or more than 0.3 weight percent but equal to or less than 10 weight percent relative to the content of the vinyl chloride resin.

2. The binder resin composition for a magnetic recording medium according to claim 1, wherein the amount of the methacrylate compound denoted by formula (A) is equal to or more than 0.3 weight percent but equal to or less than 5.44 weight percent, relative to the content of the vinyl chloride resin.

3. A method of manufacturing a binder resin composition for a magnetic recording medium according to claim 1, wherein a vinyl chloride resin containing an active hydrogen group within the molecule thereof is reacted with 2-methacryloyloxyethyl isocyanate to obtain the vinyl chloride resin containing a methacryloyloxy group, and the methacrylate compound denoted by formula (A) is produced in the reaction.

4. The method of manufacturing a binder resin composition for a magnetic recording medium according to claim 3, wherein the reaction is conducted in the presence of an organic tin catalyst.

5. The method of manufacturing a binder resin composition for a magnetic recording medium according to claim 3, wherein the active hydrogen group is a hydroxyl group.

6. The method of manufacturing a binder resin composition for a magnetic recording medium according to claim 3, wherein the vinyl chloride resin containing an active hydrogen group comprises an epoxy group within the molecule thereof.

7. A magnetic recording medium comprising a magnetic layer containing a ferromagnetic powder and a binder on a nonmagnetic support, which comprises a radiation-cured layer that has been formed by radiation-curing a coating layer containing the binder resin composition for a magnetic recording medium according to claim 1.

8. The magnetic recording medium according to claim 7, wherein the radiation-cured layer is the magnetic layer.

9. The magnetic recording medium according to claim 7, which comprises a nonmagnetic layer containing a nonmagnetic powder and a binder between the nonmagnetic support and the magnetic layer, wherein the nonmagnetic layer is the radiation-cured layer.

* * * * *